Feb. 28, 1933.    C. G. OLSON    1,899,715
LOCK NUT
Filed July 14, 1930
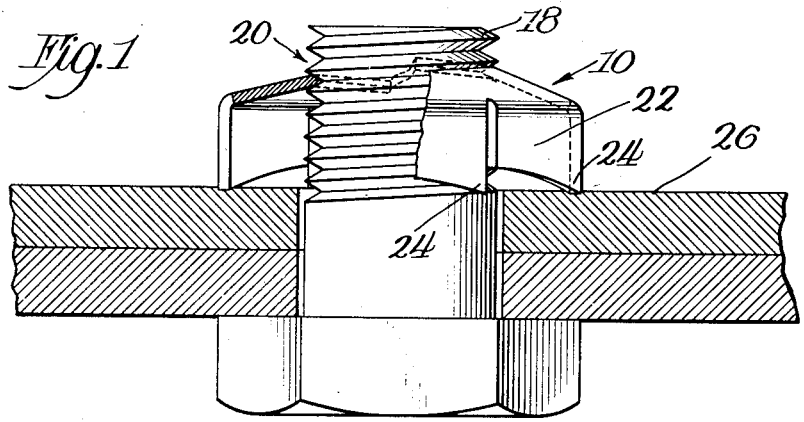
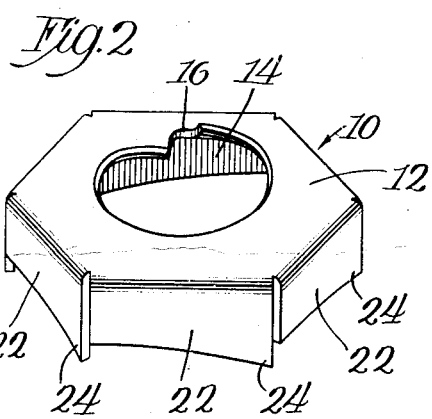
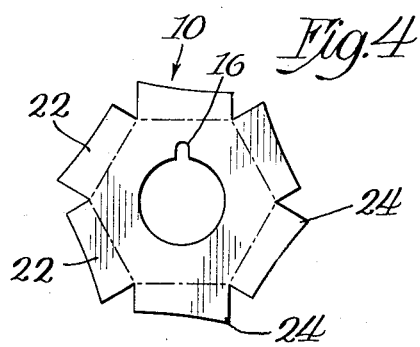
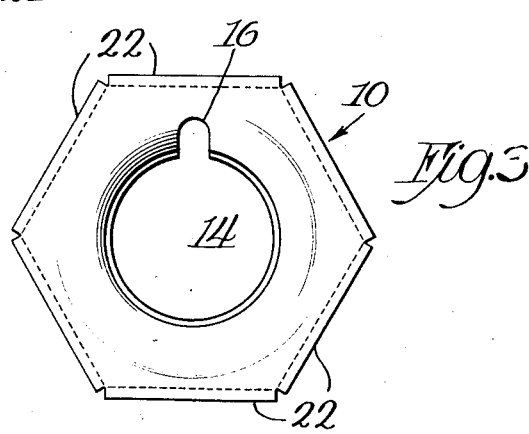
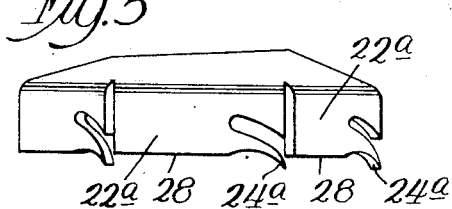
Inventor
Carl G. Olson Patented Feb. 28, 1933

1,899,715

UNITED STATES PATENT OFFICE

CARL G. OLSON, OF CHICAGO, ILLINOIS, ASSIGNOR TO SHAKEPROOF LOCK WASHER COMPANY, OF CHICAGO, ILLINOIS, A CORPORATION OF DELAWARE

LOCK NUT

Application filed July 14, 1930. Serial No. 467,651.

My invention relates generally to lock nuts and particularly to lock nuts which are capable of being formed from sheet metal and the like.

It is one of the primary objects of my invention to provide an improved lock nut of simple and durable construction, which may be conveniently produced from sheet metal by stamping, forming, or by any of the conventional machine shop methods.

More specifically, my invention contemplates the provision of a lock nut from sheet material, which is capable of being applied to a threaded bolt and which is also adapted to be turned through the agency of a suitable wrench.

Still more specifically, it is an object of my present invention to provide a lock nut as above set forth which may be applied to the threads of a member, such as a bolt without disfiguring or in any way destroying the thread contour, and which is provided with teeth adapted to be imbedded within the work piece when said nut is tightened in position.

A further object is to provide a simple and improved lock nut, which is cup-shaped, the edges of said cup-shaped body being provided with work engaging and locking teeth, and the central portion thereof being adapted for application to a threaded member.

These and numerous other objects and advantages will be more apparent from the following detailed description when considered in connection with the accompanying drawing, wherein—

Figure 1 is a side elevational view of a lock nut shown partly in section, said nut being disclosed in operative association with a threaded bolt;

Figure 2 is a perspective view of the lock nut shown in Figure 1;

Figure 3 is a plan view of the lock nut shown in Figure 2;

Figure 4 is a plan view of the lock nut blank stamped from a piece of sheet metal; and Figure 5 is a side elevational view of a lock nut provided with an alternate arrangement of work engaging prongs.

Referring now to the drawing more in detail, wherein like numerals have been employed to designate similar parts throughout the various figures, it will be seen that in Figures 1 to 4 inclusive, I have disclosed a lock nut which is designated by the numeral 10, and this lock nut is representative of one embodiment of my invention. This lock nut 10 includes an annular body portion 12 having a central aperture 14. The stock immediately adjacent the aperture 14 is provided with a notch 16 to enable said stock to be flexed into helical form, and thereby permit the lock nut to be applied to threads 18 of a bolt 20. The helical portion of the stock which engages the threads 18 is preferably V-shaped so as to conform to the thread contour of the bolt, and thereby enables the lock nut to be applied to the bolt without any possibility of disfiguring said threads.

Extending laterally from the annular body portion 12 at substantially right angles is a plurality of sections 22. Each of these sections 22 is formed with a sharpened portion or tooth 24 which is positioned on the trailing end of said sections. Thus, when the lock nut is tightened upon the bolt 20 against a work piece 26, the teeth 24 imbed themselves within said surface and thereby prevent the inadvertent loosening of said nut. In addition to providing the locking teeth, these side sections 22 also provide bearing surfaces for receiving a suitable wrench (not shown). In the drawing I have shown a hexagonal disposition of the side sections 22, but obviously these sections may be formed so as to present a lesser or greater number of sides in accordance with the demands incident to their use.

In Figure 4 I have shown a modified tooth or prong construction on the side sections. In this figure I have shown side sections 22a which are provided with resilient prongs or teeth 24a. It will be seen that the outermost edge 28 of each of the side sections 22a is substantially parallel with the plane of the annular body portion of the washer and that the work engaging corner or edge of the prong 24a extends beyond the plane which includes these edges 28. Thus, when this lock nut is tightened against the work piece, the teeth 24a first imbed themselves within the work piece, and upon continued tightening the edges 28 are brought to bear against the surface of the work piece. The engagement of the edges 28 with the work piece prevents the teeth or prongs 24a from being sprung out of locking engagement with the work. It will be apparent that the particular prong or tooth construction shown in the drawing is representative of a large number of constructions which might be employed to cause the nut to be securely locked against the work piece. In other words, my invention is capable of many other modifications and changes without departing from the spirit and scope thereof.

Having thus described my invention, what I claim as new and desire to secure by Letters Patent is:

A lock nut of sheet metal construction having an apertured body portion of conical shape which is adapted to be applied to a threaded member, and side sections angularly disposed with respect to said body portion and distributed along the margin thereof, said side sections having teeth for lockingly engaging a work piece, said conical body portion being adapted to yield axially under pressure in response to the clamping of the nut against the work piece and said side sections being disposed in such a manner as to readily receive a tightening wrench.

In witness whereof, I have hereunto subscribed my name.

CARL G. OLSON.